United States Patent [19]

Usami

[11] Patent Number: 5,696,840
[45] Date of Patent: Dec. 9, 1997

[54] IMAGE PROCESSING APPARATUS

[75] Inventor: Akihiro Usami, Yokohama, Japan

[73] Assignee: Canon Kabushiki Kaisha, Tokyo, Japan

[21] Appl. No.: 340,881

[22] Filed: Nov. 15, 1994

Related U.S. Application Data

[63] Continuation of Ser. No. 76,707, Jun. 15, 1993, abandoned, which is a continuation of Ser. No. 514,317, Apr. 25, 1990, abandoned.

[30] Foreign Application Priority Data

Apr. 28, 1989 [JP] Japan .................................. 1-109511
May 10, 1989 [JP] Japan .................................. 1-117020

[51] Int. Cl.$^6$ ............................................ G06K 9/00
[52] U.S. Cl. ........................................ 382/167; 358/520
[58] Field of Search .......................... 358/516, 518–520, 358/526, 500; 356/402, 405, 406; 382/162, 167

[56] References Cited

U.S. PATENT DOCUMENTS

| | | | |
|---|---|---|---|
| 3,877,068 | 4/1975 | Kosaka et al. | 358/29 |
| 4,675,725 | 6/1987 | Parkyn | 358/22 |
| 4,683,492 | 7/1987 | Sugiura | 358/80 |
| 4,736,245 | 4/1988 | Seto et al. | 358/76 |
| 4,853,768 | 8/1989 | Suzuki | 358/80 |
| 4,883,360 | 11/1989 | Kawada et al. | 356/402 |
| 4,908,701 | 3/1990 | Udagawa | 358/80 |
| 4,945,406 | 7/1990 | Cok | 358/516 |
| 4,962,418 | 10/1990 | Kamaga | 358/29 |
| 5,049,985 | 9/1991 | Outa | 358/80 |
| 5,073,818 | 12/1991 | Iida | 358/80 |

FOREIGN PATENT DOCUMENTS

| | | |
|---|---|---|
| 258740 | 3/1988 | European Pat. Off. . |
| 266186 | 5/1988 | European Pat. Off. . |

*Primary Examiner*—Joseph Mancuso
*Attorney, Agent, or Firm*—Fitzpatric, Cella, Harper & Scinto

[57] ABSTRACT

There is provided an image processing apparatus for executing a process to an input image in accordance with the characteristics thereof, comprising: an input device to input image data; a detector to detect the characteristics of the input image; and a processor to execute first and second processes such as brightness correcting processes or color balance correcting processes for the input image data on the basis of weights corresponding to the characteristics of the input image. When the weight of the first process is large, the weight of the second process is set to a small value. As the characteristics of the input image are deviated from a predetermined condition, the processor sets the weight of the first process to a small value and sets the weight of the second process to a large value. With the apparatus, the brightness and the color balance of the input image are preferably corrected and a natural image can be output irrespective of the characteristics of the image reading apparatus.

9 Claims, 16 Drawing Sheets

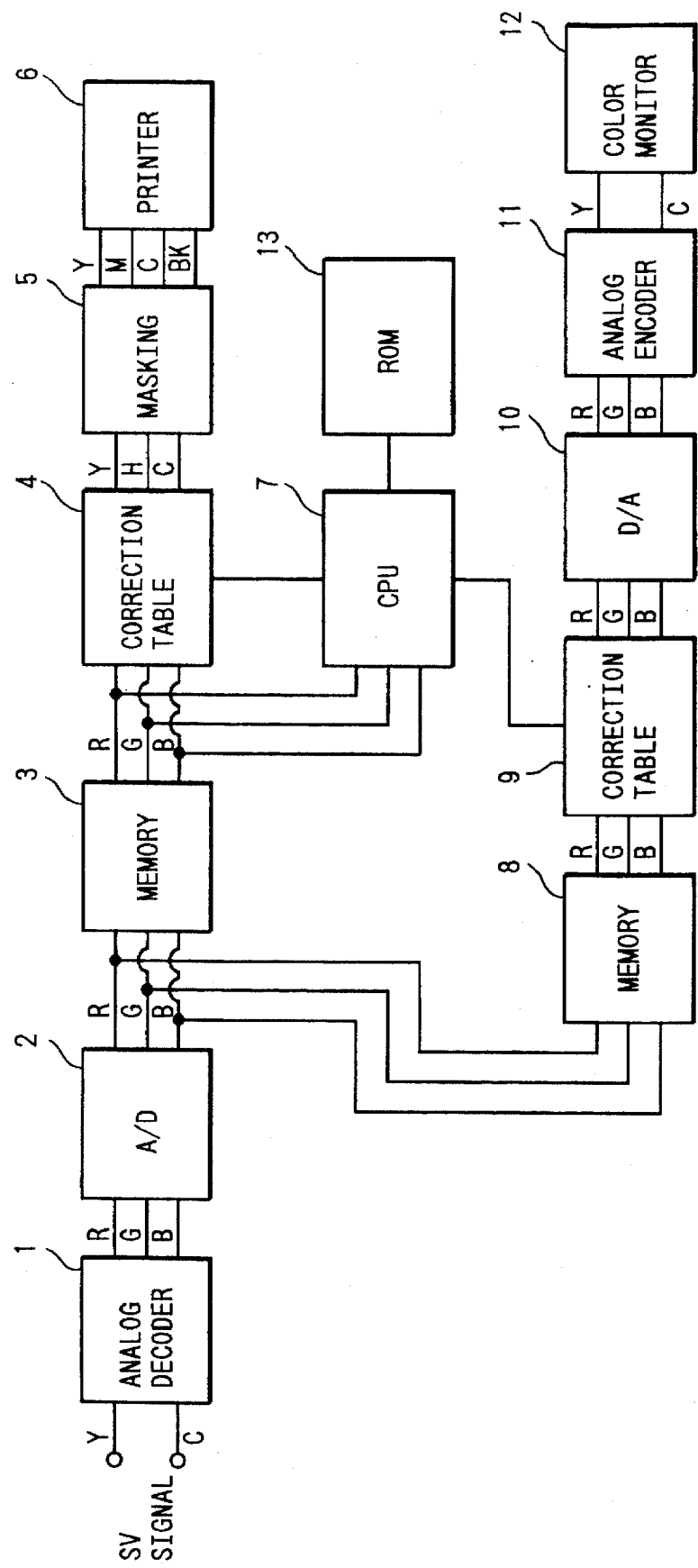

| FIG. 4B-1 |
| --- |
| FIG. 4B-2 |

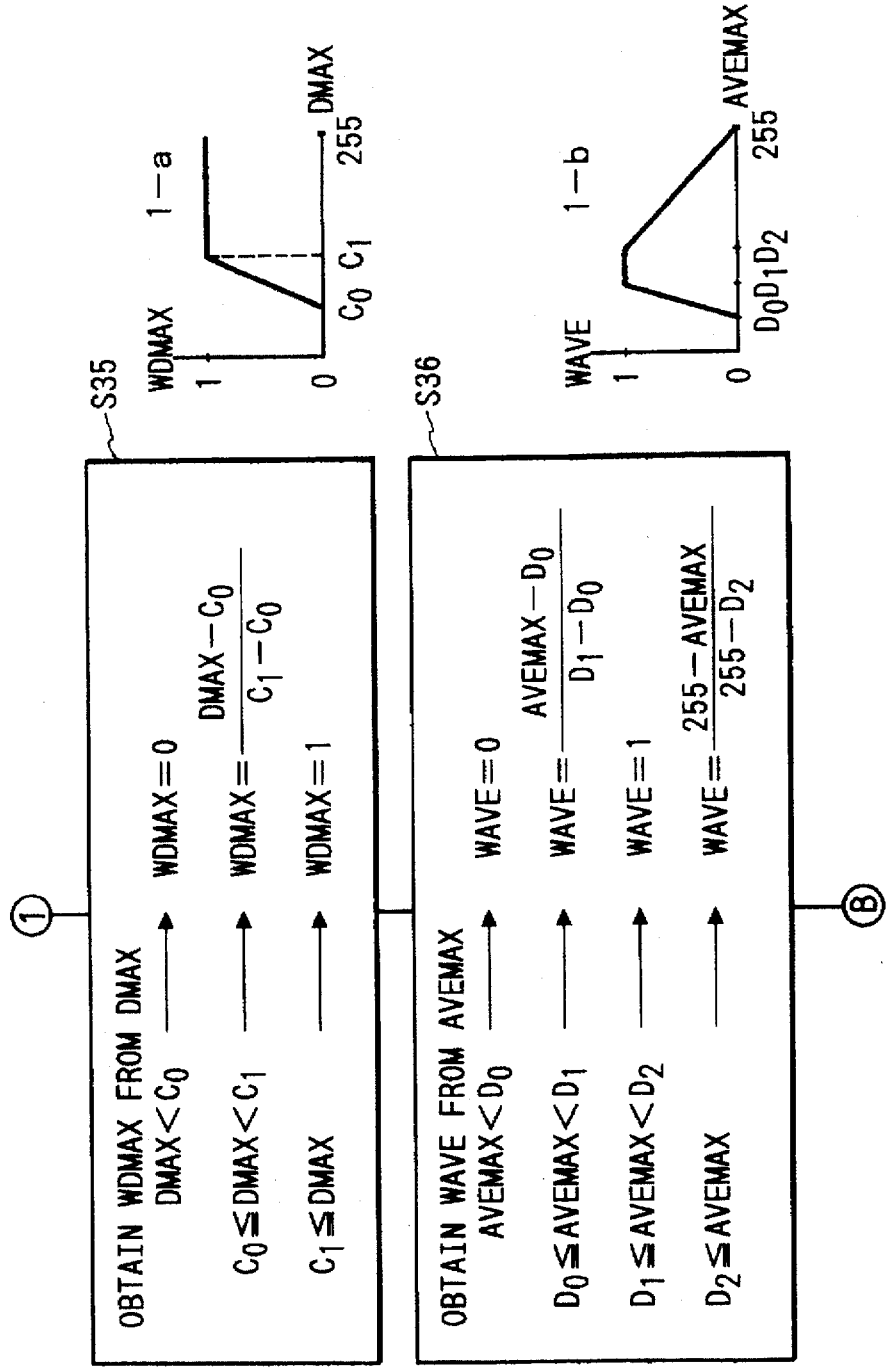

FIG. 9C

| FIG. 9C-1 |
| FIG. 9C-2 |

FIG. 9C-1

S39 — CALCULATE COLOR BALANCE CORRECTION RATIO FROM RATIO OF WHITE LEVEL TO AVERAGE VALUE $$BALR = WDSA * \frac{DMAX}{RMAX} + (1-WDSA) * \frac{AVEMAX}{AVER}$$

$$BALG = WDSA * \frac{DMAX}{GMAX} + (1-WDSA) * \frac{AVEMAX}{AVEG}$$

$$BALB = WDSA * \frac{DMAX}{BMAX} + (1-WDSA) * \frac{AVEMAX}{AVEB}$$

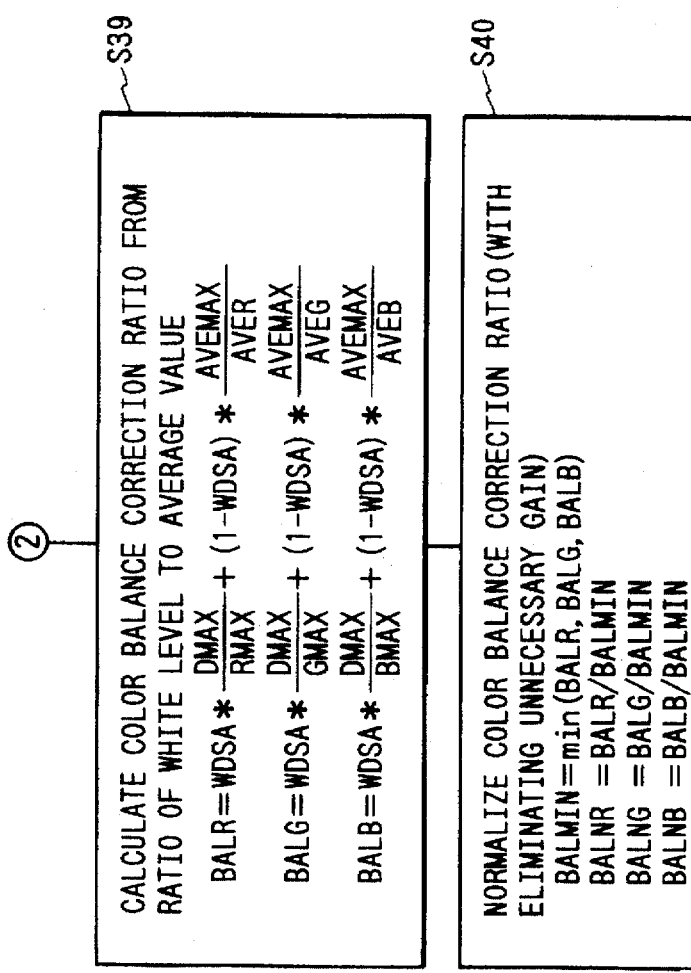

AVEMAX    DMAX
WDSA      1-WDSA

S40 — NORMALIZE COLOR BALANCE CORRECTION RATIO (WITH ELIMINATING UNNECESSARY GAIN)

BALMIN = min(BALR, BALG, BALB)
BALNR = BALR/BALMIN
BALNG = BALG/BALMIN
BALNB = BALB/BALMIN (ANY ONE OF BALNR, BALNG, BALNB BECOMES "1")

IMAGE PROCESSING APPARATUS

This application is a continuation of application Ser. No. 08/076,707 filed Jun. 15, 1993, which was a continuation of application Ser. No. 07/514,317 filed Apr. 25, 1990, both now abandoned.

BACKGROUND OF THE INVENTION

1. Field of the Invention

The present invention relates to an image processing apparatus for executing a process according to characteristics of an input image.

2. Related Background Art

A color image signal from an image reading apparatus having an image pickup device, for instance, from an SV (still video) apparatus is digitized and subjected to signal processes such as a masking process and the like and, thereafter, it is color printed. Or, before the color image signal is digitized, the level for digitization is adjusted by an automatic gain controller (AGC) or a white balance controller.

However, for the color image signal from the foregoing image reading apparatus, a method of setting a color balance and a recording level (brightness) differ depending on the manufacturing maker of such an apparatus or the type of apparatus. Therefore, if a color image signal is simply stored into a memory and displayed by a color monitor or is processed and color printed, there are problems such that the color balance is lost and the resultant color image is slightly blue or slightly red or is dark.

SUMMARY OF THE INVENTION

It is an object of the present invention to preferably process an input image.

Another object of the invention is to preferably correct an input image.

Still another object of the invention is to preferably correct the color balance.

Further another object of the invention is to preferably correct the brightness.

Further another object of the invention is to prevent that an improper image process is executed.

Further another object of the invention is to prevent that an input image is excessively corrected.

Further another object of the invention is to prevent that an extreme process is executed to an input image.

Further another object of the invention is to output a natural image irrespective of the characteristics of an image from reading apparatus.

The above and other objects and features of the present invention will become apparent from the following detailed description and the appended claims with reference to the accompanying drawings.

DETAILED DESCRIPTION OF THE PREFERRED EMBODIMENTS

[First embodiment]

According to the embodiment, the minimum value of each component signal of a given color image signal is obtained every pixel and the color image signal is corrected on the basis of a ratio of the component signals of the pixels in which the minimum value satisfies a predetermined condition.

According to the embodiment, there is disclosed an apparatus using a method whereby an average value and the maximum RGB values which are considered to be a white level are obtained from RGB image signals which were fetched into a memory from an SV camera or an SV floppy and image data is corrected by using the average value and the maximum RGB values. However, the invention is not limited to such an embodiment but can be also applied to other various methods.

Figure 3:
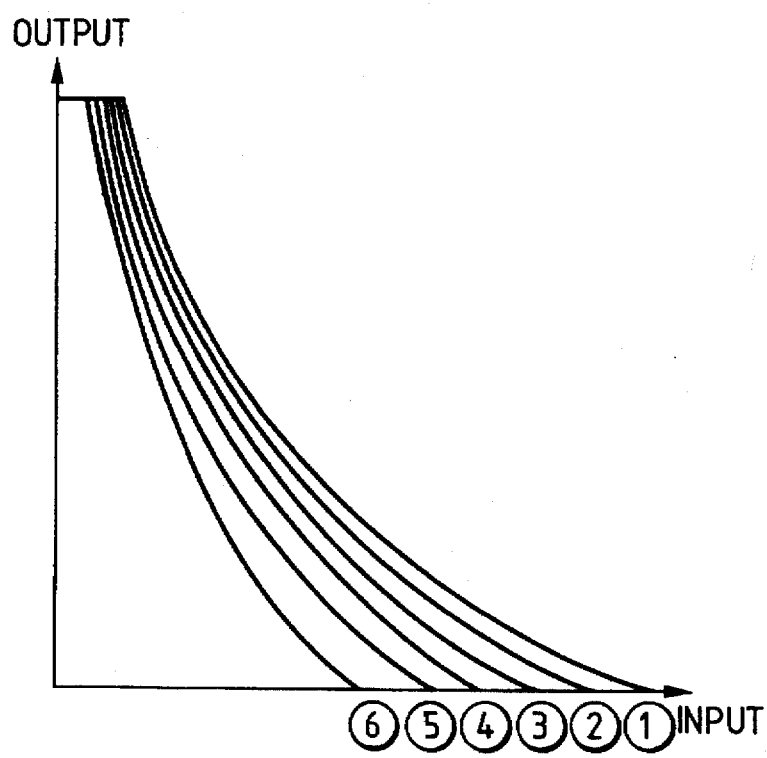
Figure 4A:
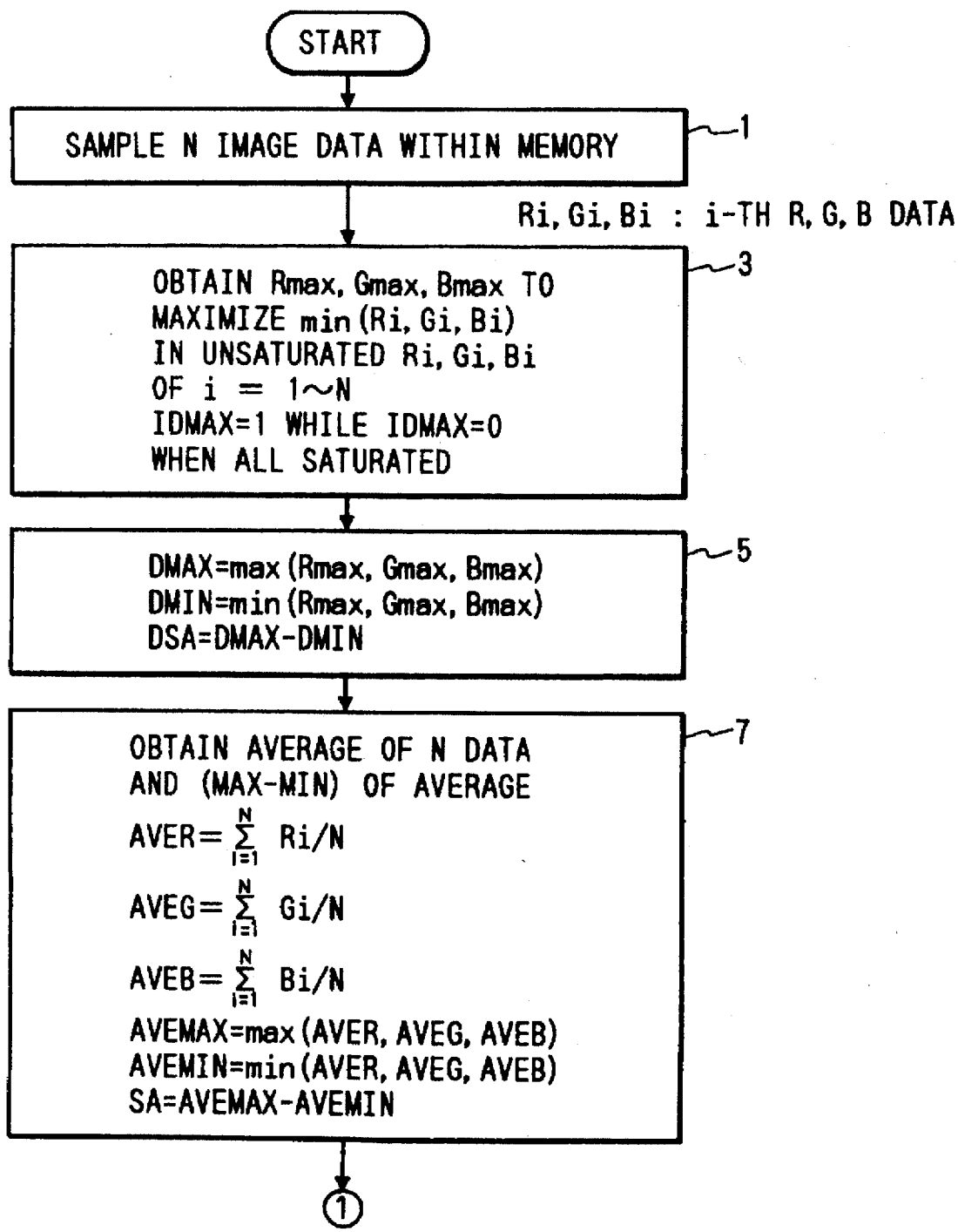
FIGS. 4A and 4B are flowcharts for the first embodiment of the invention.
Figures 1, 4B:
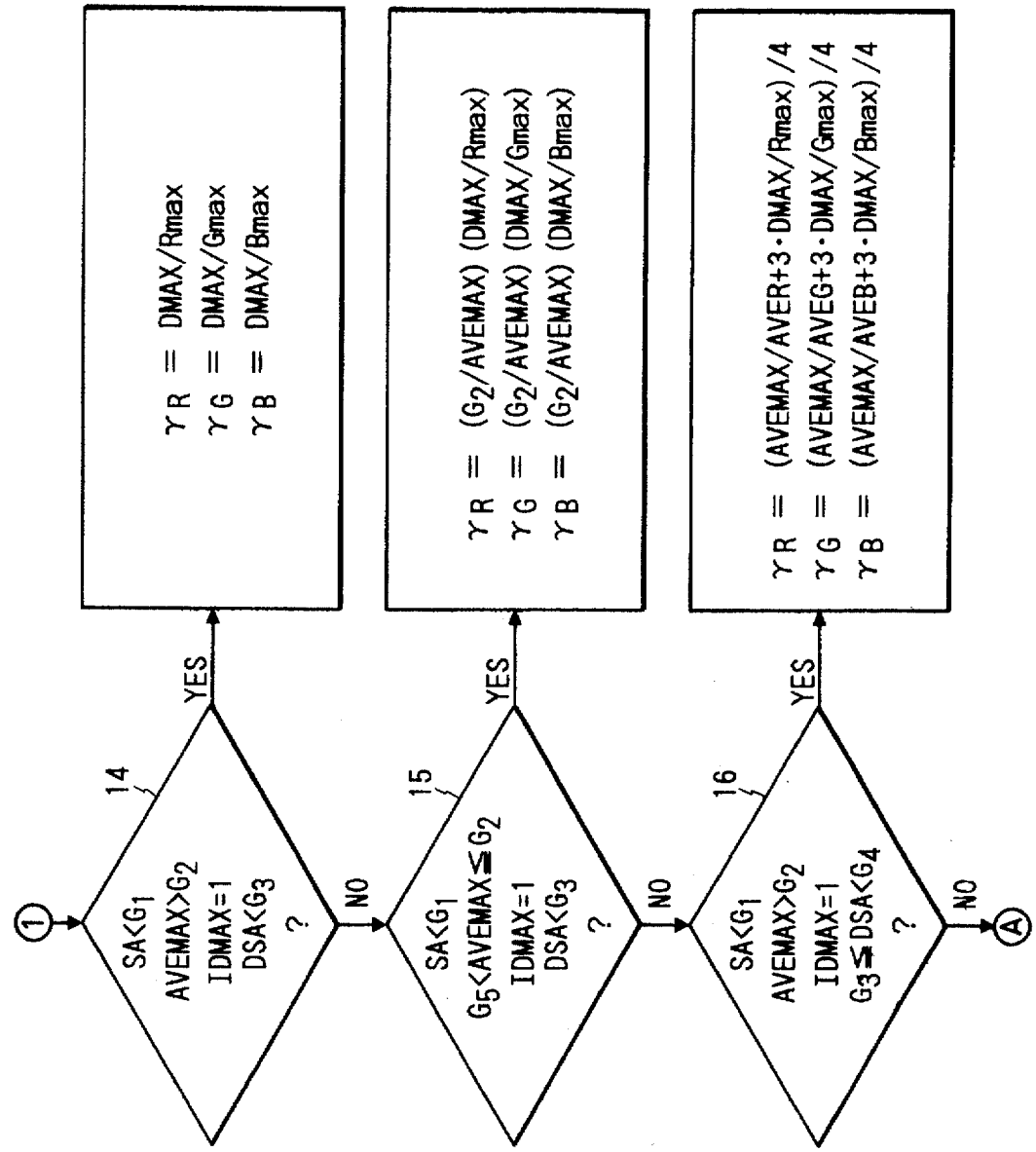
FIG. 1 is a block diagram showing a circuit construction of the first embodiment of the present invention.

FIG. 1 is a circuit block diagram showing a construction of the first embodiment of the invention. Image signals from an SV floppy or an SV camera which are input by, for instance, a Y signal and a C signal (color difference signal) are input to an analog decoder 1. In the analog decoder 1, the conversion into analog RGB signals and the correction of the levels of the analog signals by an AGC are executed. Then, the analog signals are digitized by an A/D converter 2. The digital signals are stored into a memory 3 or 8 each having a memory capacity of one picture plane. A CPU 7 extracts N points ($1 \leq N \leq$ the number of all of the pixels) from the image data in the memory and processes the data. The CPU 7 selects or makes the optimum correction table from an ROM 13 and sets into a correction table 4 or 9. In the case of selecting and setting the optimum correction table, the CPU 7 selects one of curves ① to ⑥ in FIG. 3 and sets into the correction table 4. The CPU 7 selects one of the curves ① to ⑥ in FIG. 2 and sets into the correction table 9.

A method of selecting the correction table by using the image data in the memory will now be described. FIGS. 4A and 4B are flowcharts showing procedures for such processes. First, the CPU 7 sequentially reads out N image data from the memory (step 1 in FIG. 4A). Then, the CPU 7 extracts the pixel data whose signal values are not saturated (for instance, in the case of 8 bits, the signal value is not 255) from among signal values $R_i$, $G_i$, and $B_i$ (ith pixel data; $1 \leq i \leq N$) of RGB. The CPU 7 then sets the pixel whose $\min(R_i, G_i, B_i)$ (that is, the minimum value among $R_i$, $G_i$, and $B_i$) is the largest among the pixel data into $R_{max}$, $G_{max}$, and $B_{max}$ of the maximum RGB values and sets such that IDMAX=1. On the other hand, when all of the signal values have been saturated, it is set such that IDMAX=0 (step 3 in FIG. 4A). In the case of the pixel which is slightly red, $\min(R_i, G_i, B_i)=R_i$. In the case of the pixel which is slightly green, $\min(R_i, G_i, B_i)=G_i$. In the case of the pixel which is slightly blue, $\min(R_i, G_i, B_i)=B_i$.

The maximum values $R_{max}$, $G_{max}$, and $B_{max}$ obtained are considered to be the pixel data of the portion indicative of white in one picture plane which was stored in the memory 3 or 8. Therefore, assuming that the difference between the maximum value and the minimum value of $R_{max}$, $G_{max}$, and $B_{max}$ is set to DSA, if DSA=0, this means that the color balance (white balance) is obtained. However, when DSA≠0, it is necessary to correct so as to obtain DSA=0. For $R_{max}$, $G_{max}$, and $B_{max}$, the $\min(R_i, G_i, B_i)$ is not necessarily set to the maximum pixel but may be set to, for instance, the second or third pixel from the maximum pixel. On the other hand, for example, it is also possible to calculate the average value of at most ten pixels.

In step 7 in FIG. 4A, the CPU 7 calculates average values AVER, AVEG, and AVEB of N image data, that is, all of the pixel data of one picture plane and calculates the difference between the maximum average value and the minimum average value and sets the difference into SA. If SA=0, the average density in one picture plane corresponds to achromatic color and this means that the color balance of the original image is obtained to a certain degree. This corresponds to the case where the theorem of Evans which is used when silver salt printing a transmission film is applied to the image signal from the SV. When SA≠0, this means that the color balance is deviated, so that it is necessary to correct so as to obtain SA=0.

A condition section to select the correction table will now be described by using processing steps 14 to 19 in FIG. 4B. In FIG. 4B, $G_1$, $G_2$, $G_3$, $G_4$, and $G_5$ are preset constants. For instance, $G_1=55$, $G_2=127$, $G_3=30$, $G_4=50$, and $G_5=50$. Even if the above values are slightly deviated, the picture quality of the output image does not largely deteriorate and those values can be also set by shifting by about ±20.

It is the fundamental idea that an SV image in which the difference SA of the average values and the difference DSA between the maximum and minimum values of the maximum RGB values are respectively smaller than certain values $G_1$ and $G_4$ is used as an object for the color balance correction, while an image in which the maximum value AVEMAX of the average values is darker than a certain value $G_2$ and is brighter than a certain value $G_5$ is also subjected to the correction so as to brighten such an image. Further, the brightness is corrected by the average value and the color balance is corrected by more significantly considering the maximum RGB values rather than the average value.

In step 14 in FIG. 4B, an image in which the maximum value AVEMAX of the average value is larger and brighter than $G_2$ in the case where the deviations of the balances of both of SA and DSA lie within a range of certain values $G_1$ and $G_3$ and in which the maximum RGB values are not saturated is used for the color balance correction. The CPU 7 corrects the color balance of such an image by using the maximum RGB values.

Figure 2:
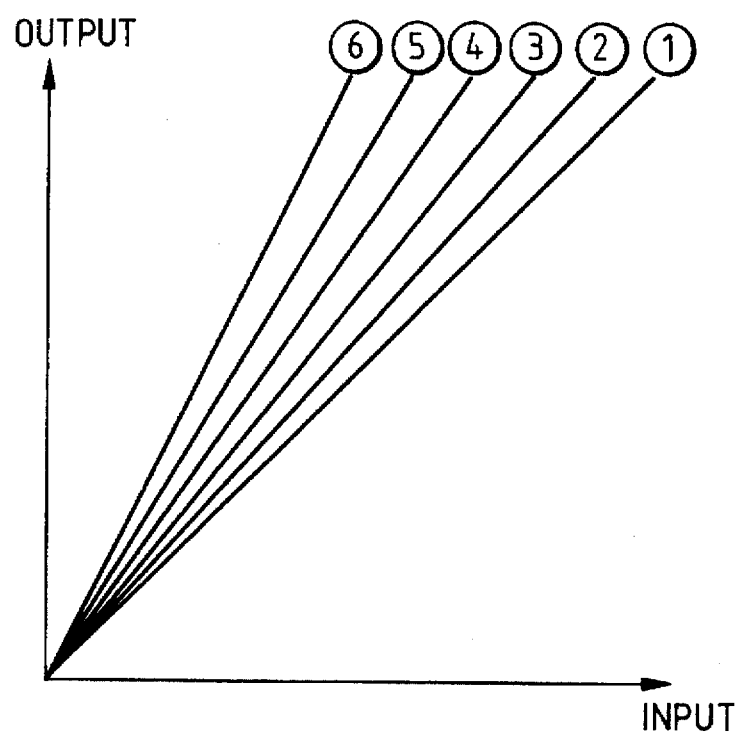
FIGS. 2 and 3 are diagrams showing contents of correction tables which are previously written into an ROM 13.

That is, $\gamma_R=DMAX/R_{max}$ $\gamma_G=DMAX/G_{max}$ $\gamma_B=DMAX/B_{max}$ where, $\gamma_R$, $\gamma_G$, and $\gamma_B$ denote gamma values and indicate inclinations in FIG. 2.

In step 15 in FIG. 4B, the condition of the maximum value AVEMAX of the average value differs from that in step 14 in FIG. 4B. Step 15 relates to the case where the AVEMAX is smaller than $G_2$ and larger than $G_5$, that is, the case where the image is dark to a certain degree. In this case, the CPU 7 uses the average value as a correction to brighten and corrects the color balance in a manner similar to the process in step 14 in FIG. 4B. That is, $\gamma_R=(G_2/AVEMAX)(DMAX/R_{max})$ $\gamma_G=(G_2/AVEMAX)(DMAX/G_{max})$ $\gamma_B=(G_2/AVEMAX)(DMAX/B_{max})$ Steps 16 and 17 in FIG. 4B relate to the processing steps to discriminate the case where the difference DSA of the maximum RGB values is slightly large. Since there is a possibility such that a pixel in which the maximum RGB values are slightly deviated from the white portion in one picture plane was picked up, the CPU 7 corrects the color balance by using both of the maximum RGB values and the average value.

When the maximum value AVEMAX of the average value is larger than $G_2$ and the image is bright, in step 16 in FIG. 4B, the following processes are executed.

$\gamma_R=(AVEMAX/AVER+3DMAX/R_{max})/4$ $\gamma_G=(AVEMAX/AVEG+3DMAX/G_{max})/4$ $\gamma_B=(AVEMAX/AVEB+3DMAX/B_{max})/4$ On the other hand, when the maximum value AVEMAX of the average value is smaller than $G_2$ and larger than $G_5$, that is, when the image is dark to a certain degree, in step 17 in FIG. 4B, the following processes are executed.

$\gamma_R=(G_2/AVEMAX)(AVEMAX/AVER+3DMAX/R_{max})/4$ $\gamma_G=(G_2/AVEMAX)(AVEMAX/AVEG+3DMAX/G_{max})/4$ $\gamma_B=(G_2/AVEMAX)(AVEMAX/AVEB+3DMAX/B_{max})/4$ Steps 18 and 19 in FIG. 4B relate to the case where the value of the difference DSA of the maximum RGB values is further large. In this case, further, under the condition such that the difference SA of the average value is small and the maximum RGB values are saturated, the color balance is corrected by using the average value.

In the case where the AVEMAX is larger than $G_2$ and the image is bright, the following processes are executed.

$\gamma_R=AVEMAX/AVER$ $\gamma_G=AVEMAX/AVEG$ $\gamma_B=AVEMAX/AVEB$

On the other hand, in the case where the AVEMAX is smaller than $G_2$ and the image is dark, the following processes are executed.

$\gamma_R=G_2/AVER$ $\gamma_G=G_2/AVEG$ $\gamma_B=G_2/AVEB$

In the case of the image which does not satisfy the conditions in steps 14 to 19, the CPU 7 sets $\gamma_R=\gamma_G=\gamma_B=1$ so as not to correct anything. As mentioned above, $\gamma_R$, $\gamma_G$, and $\gamma_B$ denote the inclinations in FIG. 2. The CPU 7 selects the inclinations near the $\gamma$ obtained among ① to ⑥ in FIG. 2 for RGB, respectively, and sets into the correction table 9. On the other hand, in correspondence to either one of the gamma correction curves ① to ⑥, the CPU 7 also selects the table in FIG. 3 and sets into the correction table 4. As mentioned above, the correction tables 4 and 9 are set.

The processes after the correction tables were set will now be described.

When the correction table 4 is set, the SV image in the memory 3 is subjected to the degamma process (the given image signal is raised to 2.2nd power) and the density converting (logarithmic conversion) process by the correction table 4 together with the corrections of the color balance and brightness. That is, the correction table 4 converts each of the RGB signals of the SV image which was read out of the memory 3 in accordance with the tables which were independently set and outputs as Y, H, and C signals. In the next masking porcess, the YHC signals are subjected to the processes such as elimination of impurity of the color, undercolor removal, and the like, so that the signals of Y, M, C, Bk (yellow, magenta, cyan, black) are obtained and output to a printer 6. As a printer 6, any one of the electrophotographic type, ink jet type, and thermal copy transfer type can be used.

When the correction table 9 is set, the color balance and brightness of the image data of the memory 8 are corrected by the correction table 9. The corrected image data is converted into the analog signals by a D/A converter 10 and converted into the luminance (Y) signal and color difference signal for monitor by an analog encoder 11 and displayed by a color monitor 12.

In the above description, one of the gamma correction curves to be written into the tables 4 and 9 has been selected from among the correction tables ① to ⑥ in FIGS. 2 and 3. However, such a gamma correction curve may be also formed from the values of $\gamma_R$, $\gamma_G$, and $\gamma_B$ by the CPU 7. On the other hand, the number of tables to be selected can be also increased or decreased as necessary. On the other hand, although the brightness has been corrected by using the average value of the whole picture plane, it is also considered to use the maximum RGB values or to combine both of the average value and the maximum RGB values. In addition, although the maximum RGB values have preferentially been used to correct the color balance, it is also possible to change the order of priorities.

Further, although the embodiment has been described with respect to the case of processing by the RGB, it is also possible to input yellow, magenta, and cyan signals and to process.

[Second embodiment]

Figures 2, 4B:
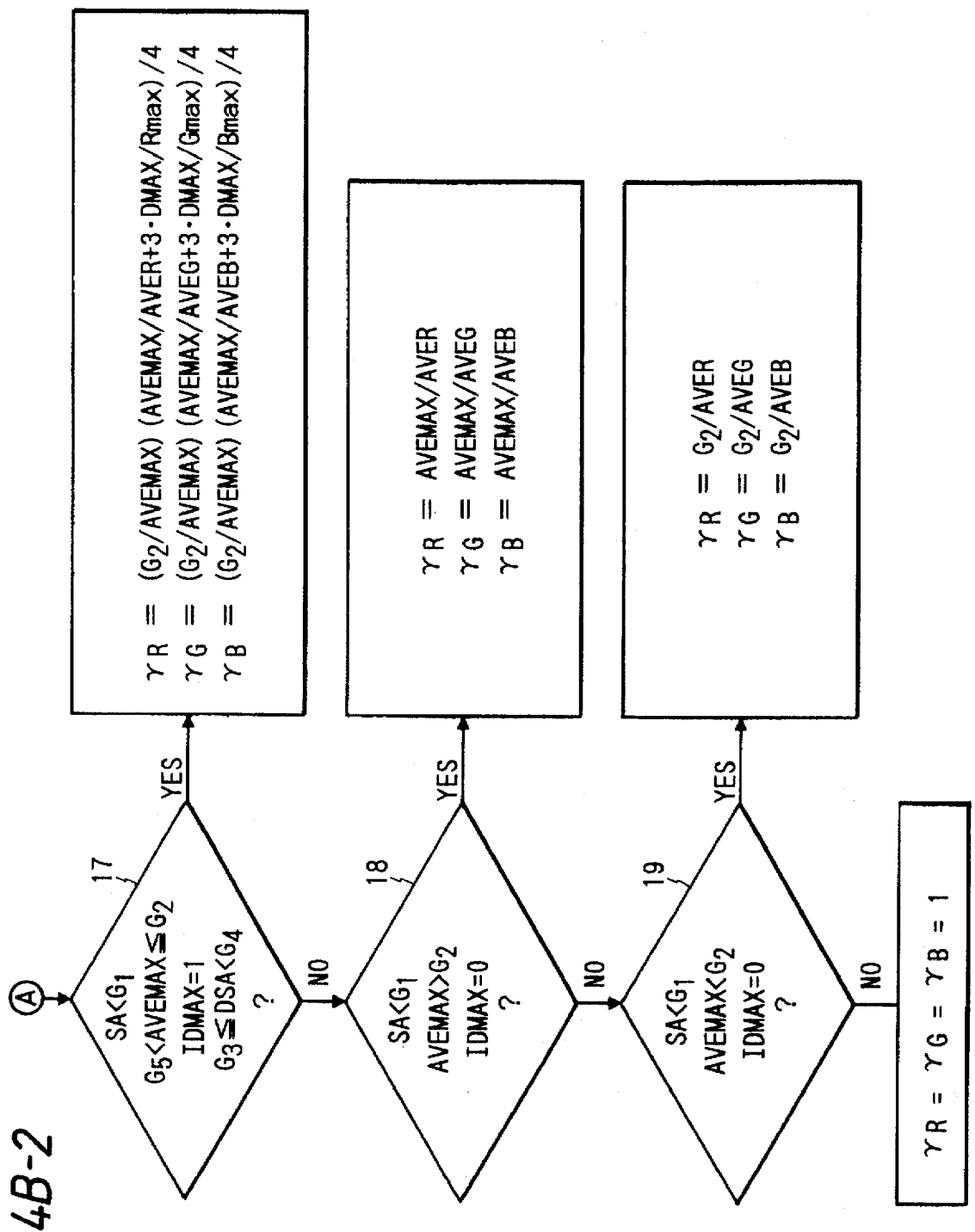
Figure 5:
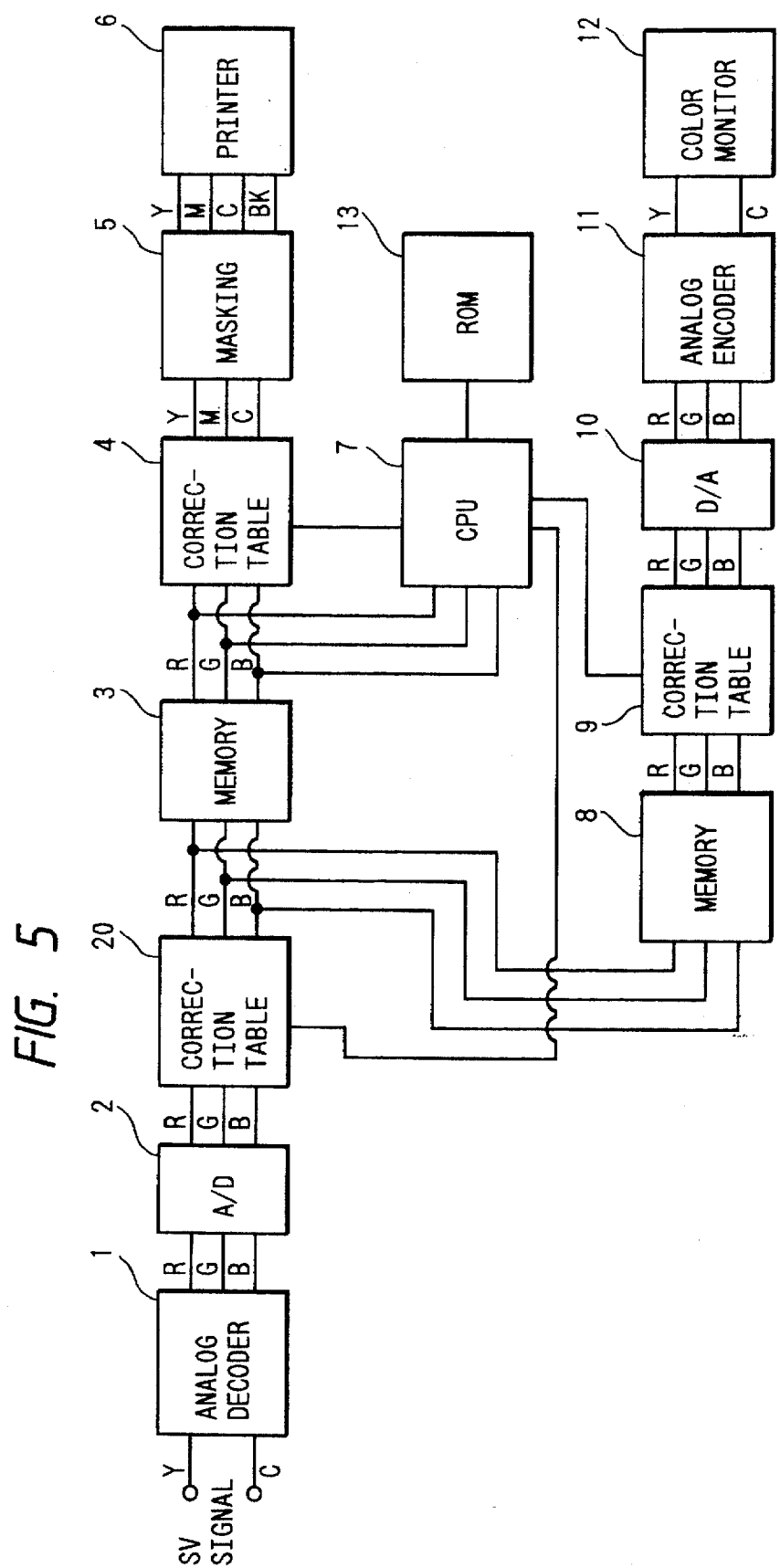
FIG. 5 is a block diagram showing a circuit construction of the second embodiment of the invention.

On the other hand, as shown in FIG. 5, a correction table 20 can be also provided before the memory 3. That is, the correction table 20 is once set such that $\gamma_R=\gamma_G=\gamma_B=1$, the image signals are stored into the memory 3, and the color balance and brightness are reset into the correction table 20 from the values of $\gamma_R$, $\gamma_G$, and $\gamma_B$ which were examined and obtained by the processes of FIG. 4. Furthermore, the image is again stored into the memory 3 or 8 from the SV camera or SV floppy and the image whose color balance and brightness were corrected by the correction table 20 is written into the memory.

In this case, in the correction table 4, the degamma process and the density conversion are executed. In the correction table 9, the conversion is not performed. It is also possible to construct in a manner such that the degamma process is executed in the correction table 20, the density conversion is performed in the correction table 4, and the gamma process is performed in the correction table 9.

On the other hand, in the embodiment, although the process to make the image bright is executed for only the dark image, it is also possible to add a method of correction such as to return the image which is too bright to the image of the normal brightness.

As described above, according to the embodiment, by sampling the image signal and by selecting or making a correction table so as to correct the color balance and brightness, the deviation of the color balance or the difference of the recording level (brightness) which is caused due to the difference of the makers of the still video camera or due to the difference of the apparatuses can be corrected and there is an effect such that a natural preferable image is obtained.

Although the explanation has been made with respect to the example in which the image which was photographed by the still video camera is corrected, the invention is not limited to such an example but can be also applied to other image signal such as a color image signal which was obtained by photoelectrically converting an image of a film by a film scanner.

As mentioned above, according to the embodiment, the color balance can be also preferably corrected.

[Third embodiment]

According to the third embodiment, the white level and the average level of the input color image signals are calcualted, further, the dependencies on the white level and average level of the color balance correction and brightness correction are calculated, and thereby executing the correction based on the dependencies calculated and thereby executing the optimum correction to the color image signals on the basis of the white level and average level.

Figure 6:
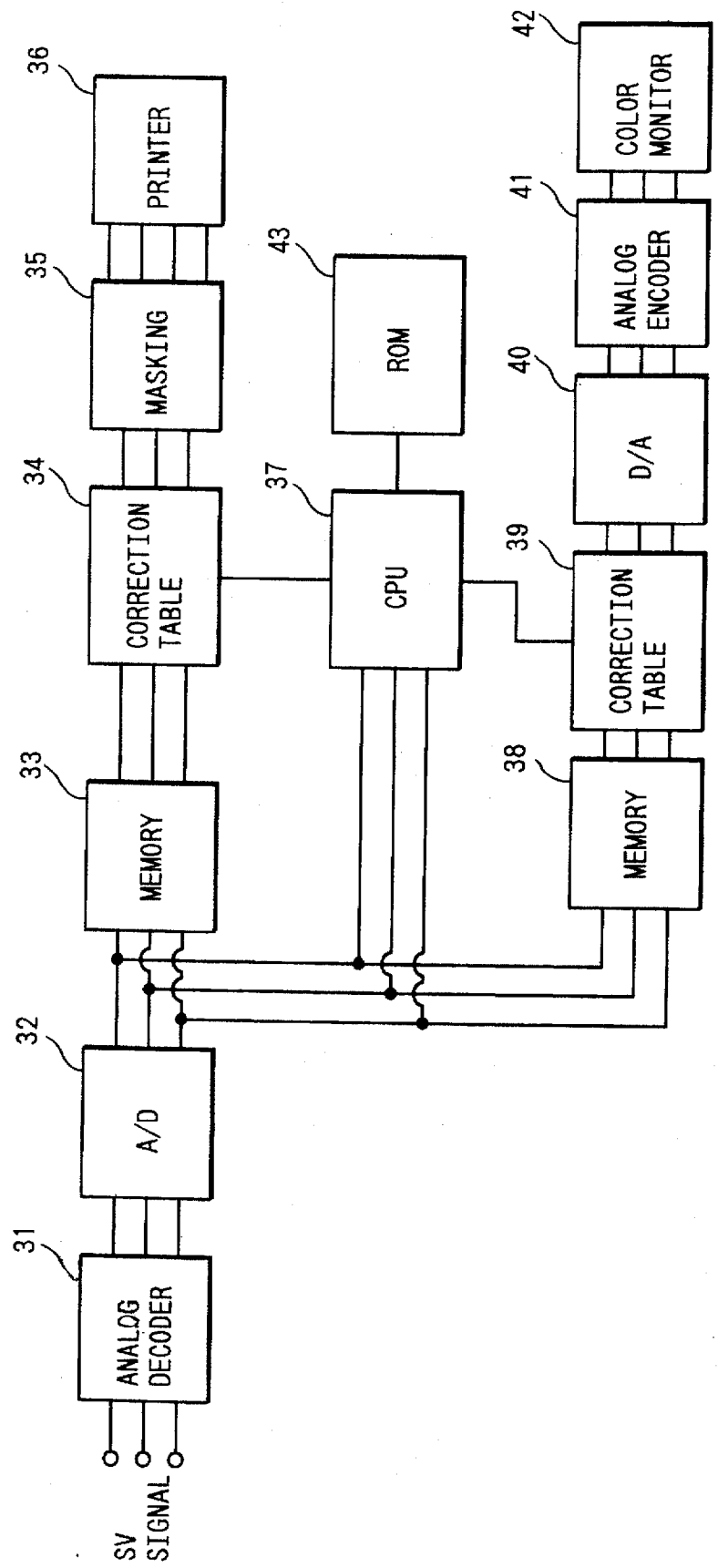
FIG. 6 is a circuit block diagram of the third embodiment of the invention.

FIG. 6 is a circuit block diagram of the embodiment. First, the operation of FIG. 6 will be described. The image signal is extracted from the SV (still video) camera of from the SV floppy in which the image which was photographed by the SV camera was stored. The extracted image signal is input to an analog decoder 31. The conversion from the R (red), G (green), and B (blue) digital signals into the analog signals is executed and the levels of the analog signals are corrected by the AGC (automatic gain controller). The input signals are not limited to the RGB signals but a Y (luminance) signal and a C (chrominance) signal can be also used as shown in FIG. 1.

The level correction of the analog signals is executed as a pre-processing for making it easy to execute the correction of the digital signals which is executed subsequently.

The analog signals are then converted into the digital signals by an A/D (analog/digital) converter 32 and the digital siganls are stored into a memory 33 or 38.

Figure 7:
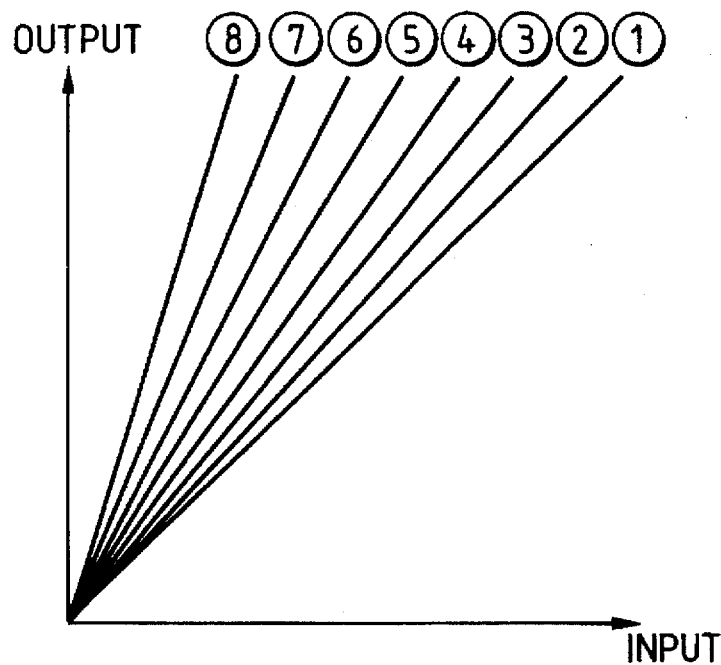
FIGS. 7 and 8 are diagrams showing contents of correction tables written in an ROM 43.
Figure 8:
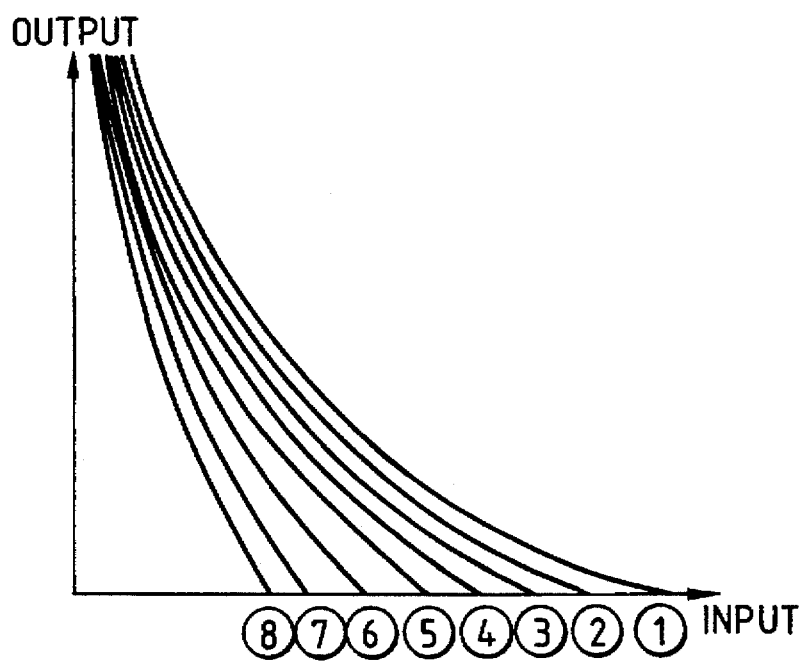

A CPU 37 extracts N points ($1 \leq N \leq$ the number of all of the pixels) from the image data in the memory and processes the data. Then, the CPU 37 selects the optimum correction table from a plurality of tables which have previously been registered in an ROM 43 and sets into a correction table 34 or 39. One of correction curves ① to ⑥ in FIG. 8 is selected and set into the correction table 34. One of correction curves ① to ⑥ in FIG. 7 is selected and set into the correction table 39.

Figure 9A:
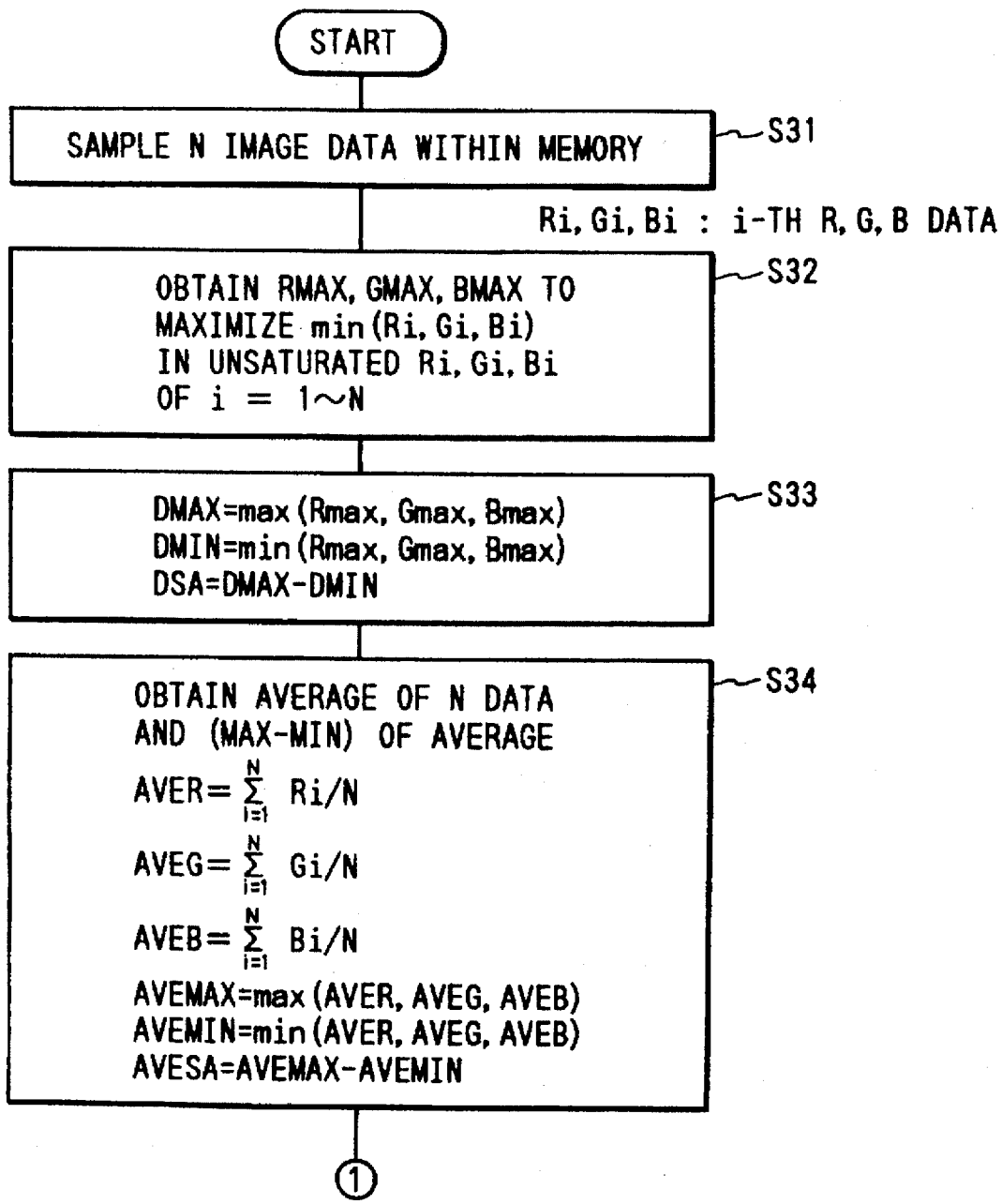
FIGS. 9A to 9C are flowcharts for the third embodiment of the invention.
Figures 2, 9B:
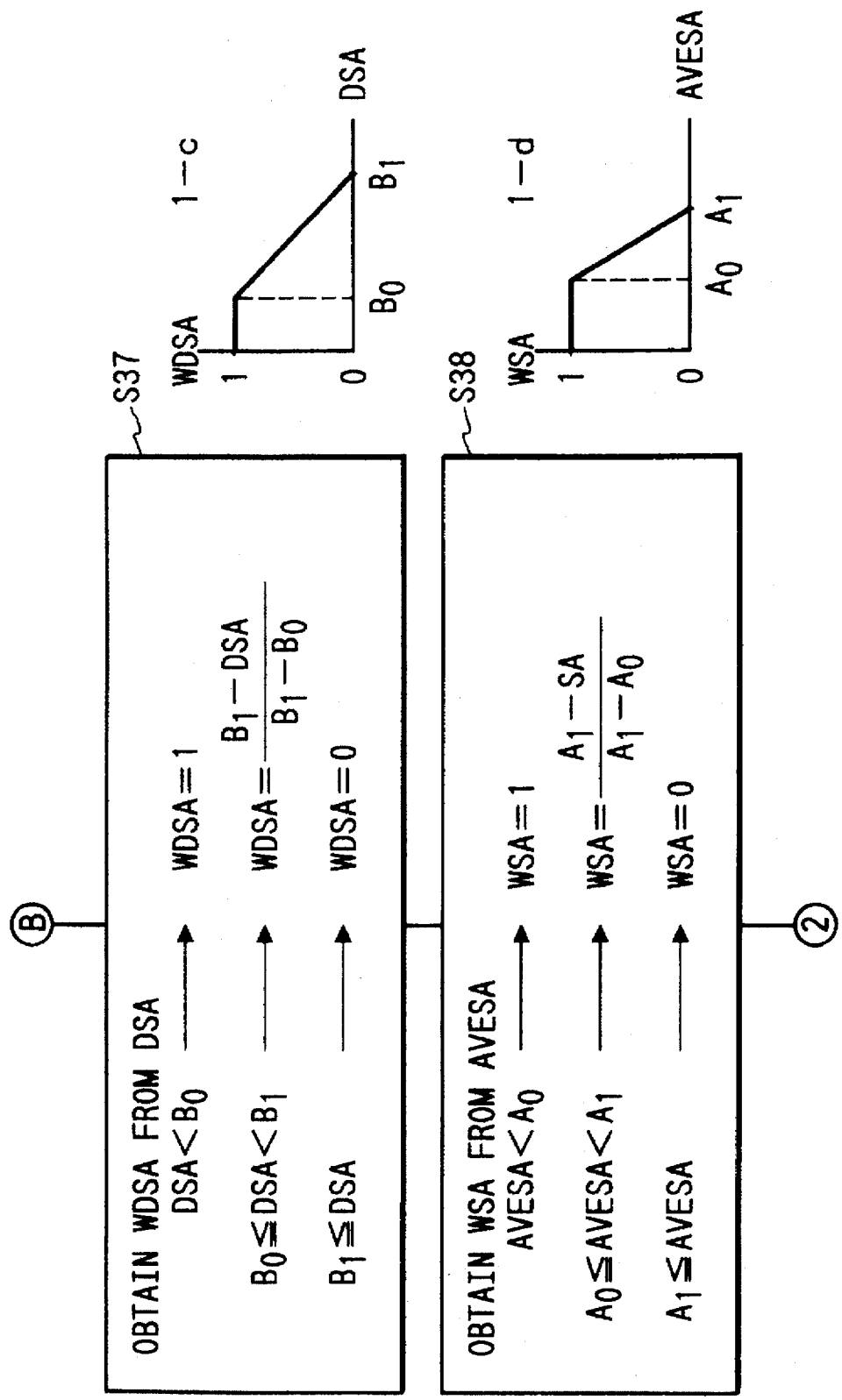
Figures 2, 9C:
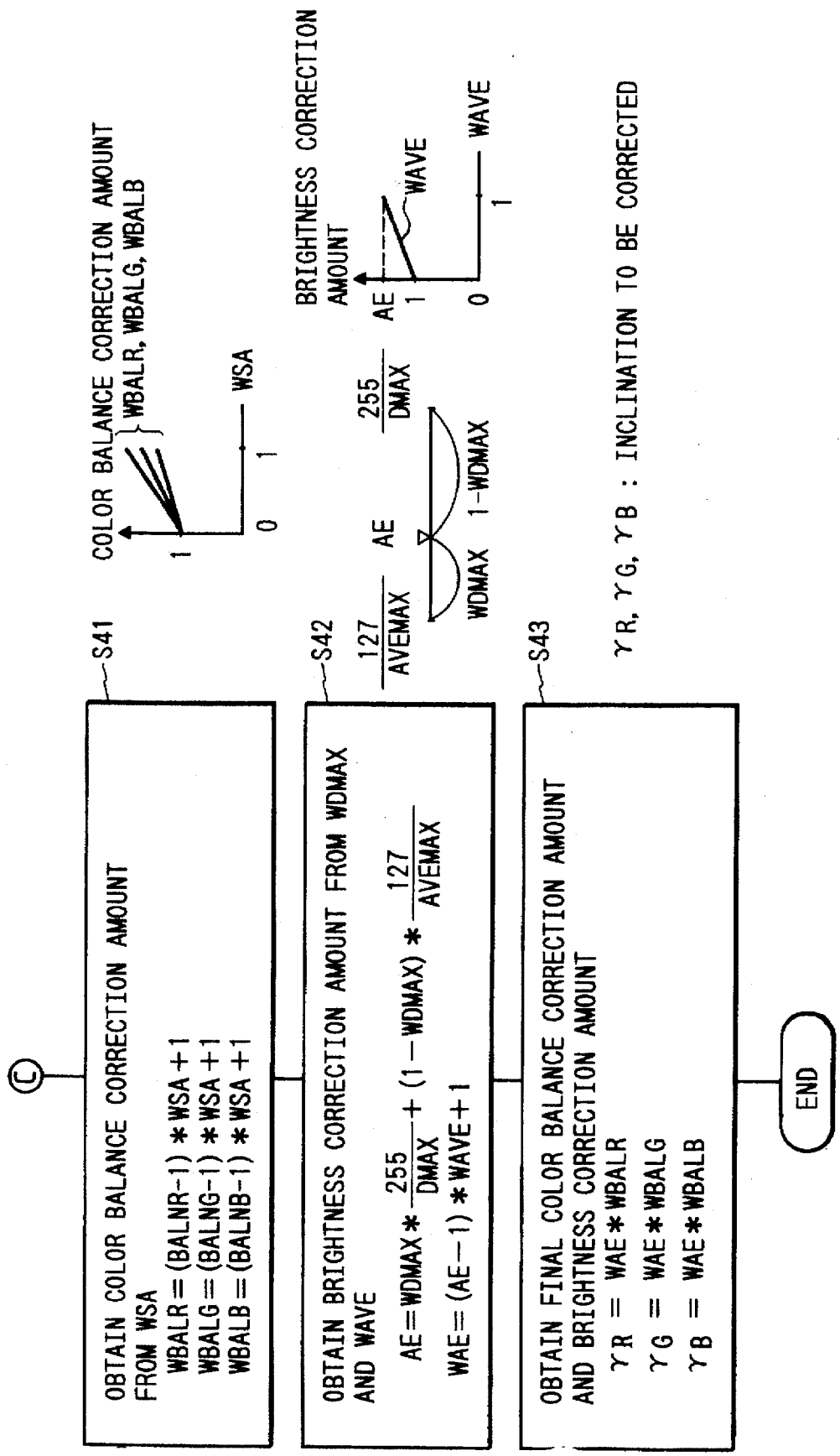
Figure 10:
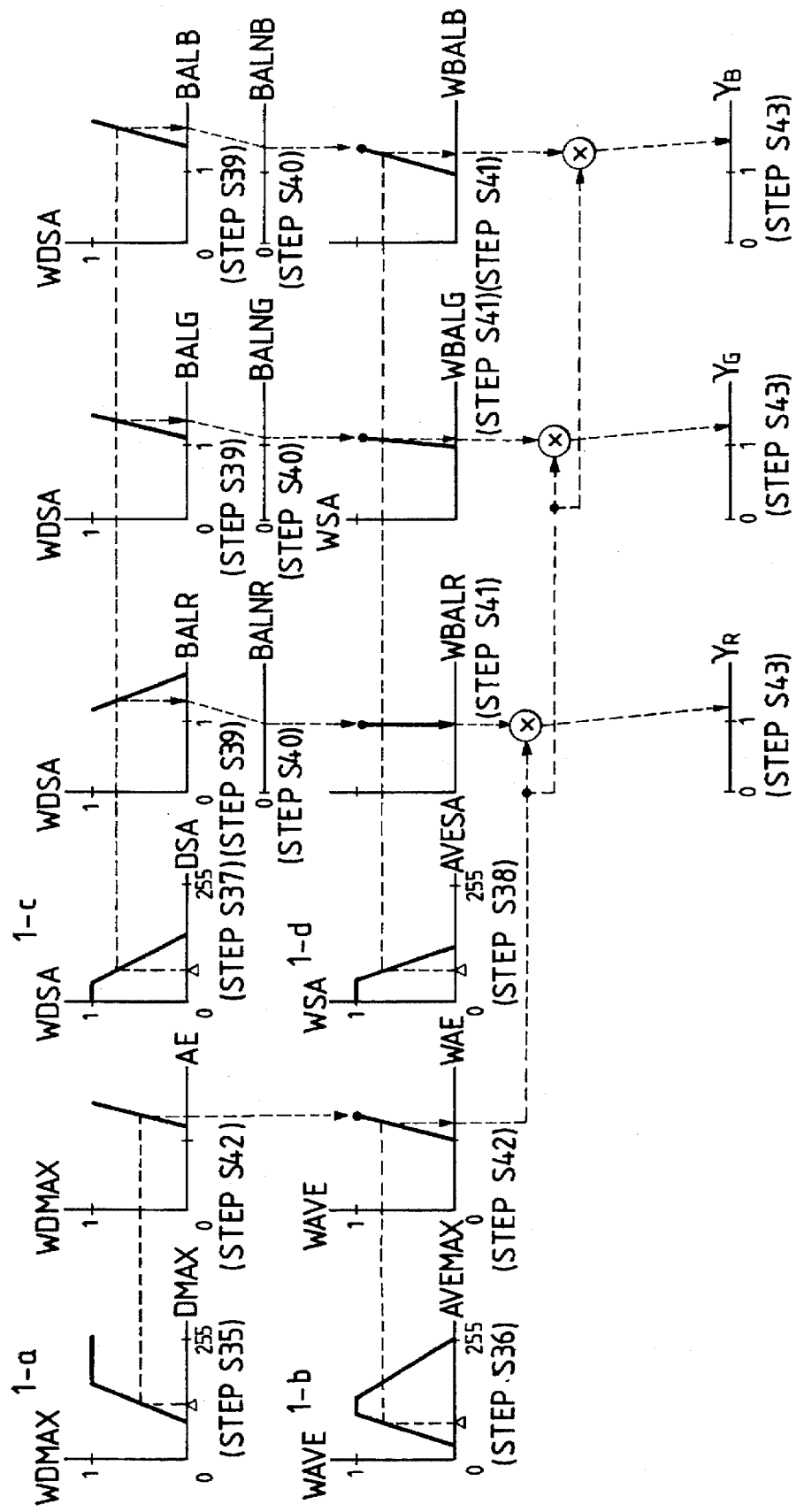
FIG. 10 is a schematic diagram showing processes in the third embodiment of the invention.

The selection of the correction table will now be described. FIG. 10 is a diagram to obtain the inclination of FIG. 7 of the correction table. FIGS. 9A to 9C are flowcharts to obtain the inclination of the correction table.

First, the CPU 37 sequentially reads out N images data from the memory 33 (step S31) and extracts the pixel data in which the signal value is not saturated (for instance, when the image data is constructed by eight bits, assuming that pure white is set to 255, the case where the signal value is not saturated corresponds to a value other than 255) among signal values $R_i$, $G_i$, and $B_i$ (ith pixel data; $1 \leq i \leq N$) of R, G, and B. This is because if even one of $R_i$, $G_i$, and $B_i$ is saturated, the data is deviated from the original image, so that the color balance of the original image cannot be accurately judged.

The CPU 37 obtains the pixel in which the minimum value among the extracted signal values $R_i$, $G_i$, and $B_i$ is the largest among the N pixels. Then, the CPU 37 sets the R, G, and B components of such a pixel into RMAX, GMAX, and BMAX (step S32). The minimum value among $R_i$, $G_i$, and $B_i$ shows the feature of the pixel data. That is, in the case of a pixel which is slightly red, the minimum value of $R_i$, $G_i$, and $B_i$ is set to $R_i$. The pixel in which the minimum value among $R_i$, $G_i$, and $B_i$ is largest denotes the pixel in which the components indicative of the feature of the pixel data are smallest. Therefore, RMAX, GMAX, and BMAX are considered to be the $R_i$, $G_i$, and $B_i$ components of the pixel indicative of the white portion in the SV image. The CPU 37 sets the maximum value among RMAX, GMAX, and BMAX into DMAX and also sets the difference between the maximum value and the minimum value into DSA (step S33). DMAX corresponds to the smallest one of the R, G, and B components of the pixel which is considered to be white. When DSA=0, this means that the color balance (white balance) of the pixel which is considered to be white is obtained. However, when DSA≠0, it is necessary to correct such as to obtain DSA=0.

Then, the CPU 37 obtains the average values AVER, AVEG, and AVEB of the N image data $R_i$, $G_i$, and $B_i$. The maximum value among AVER, AVEG, and AVEB is set into AVEMAX and the difference between the maximum value and the minimum value is set into AVESA (step S34). AVEMAX corresponds to the smallest one of the R, G, and B components of the average pixel data. If AVESA=0, the average density of the SV image denotes an achromatic color and shows that the color balance of the SV image is obtained to a certain degree. Such a case corresponds to that the theorem of Evans which is used when a transmission film is silver salt printed is applied to the SV image. If AVESA≠0, this means that the color balance is deviated. Therefore, it is necessary to correct such as to obtain AVESA=0.

In FIG. 10, reference numerals 1-*a*, 1-*b*, 1-*c*, and 1-*d* denote membership functions with respect to the maximum value DMAX among the components of the white level, the maximum value AVEMAX among the average values of $R_i$, $G_i$, and $B_i$ of all of the image data, a chromatic color chromaticity DSA of the white level, and the chromatic color chromaticity AVESA of the average value of all of the image data. The membership functions 1-*a*, 1-*b*, 1-*c*, and 1-*d* have previously been registered as tables in the ROM 43, respectively.

The CPU 37 obtains the grade of a white level dependency WDMAX for brightness correction from the maximum value DMAX of the white level by the membership function 1-*a* (step S35). The membership function 1-*a* is set in a manner such that when the maximum value DMAX of the white level is large, a significance is paid to the white level than the average value of all of the image data when the brightness is corrected. That is, the fact that the value of DMAX is large denotes that the pixel which was determined to show white is a pixel which is actually close to white. On the contrary, the fact that the value of DMAX is small means that the pixel which was decided to show white is a pixel which is actually far from white and, therefore, an importance cannot be paid to the white level extracted from N image data. In more detail, the membership function 1-*a* specifies the relation between the maximum value DMAX of the white level and the white level dependency WDMAX for the brightness correction in the following manner. That is, when DMAX is larger than a certain value $C_1$, WDMAX=1. When DMAX is smaller than a certain value $C_0$ ($C_0<C_1$), WDMAX=0. When DMAX has a value within a range from $C_0$ to $C_1$, WDMAX gradually changes from 0 to 1.

Figure 11A:
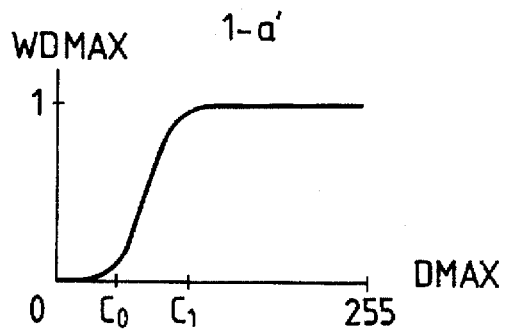
FIGS. 11A to 11D are diagrams showing contents of correction tables based on other membership functions in the third embodiment of the invention.

For example, $C_0=60$ and $C_1=127$. Even if those values are slightly deviated, the picture quality of the output image does not largely deteriorate. Those values can be also set by deviating by about ±20. On the other hand, for instance, the membership function 1-*a* can be also set as shown in FIG. 11A.

Then, the CPU 37 obtains the grade of a brightness correction ratio WAVE from the average maximum value AVEMAX by the membership function 1-*b* (step S36). The membership function 1-*b* is set in a manner such that the degree to correct the brightness decreases as the average maximum value AVEMAX is smaller or larger than the central value. That is, when the input image is inherently dark, if the correction to brighten the image is executed, the characteristics of the input image will have been changed than they are needed. Therefore, in the embodiment, the membership function 1-*b* specifies the relation between the maximum value AVEMAX of the average value and the brightness correction ratio in the following manner. That is, when AVEMAX lies within a range from a certain value $D_1$ to a certain value $D_2$ ($D_2>D_1$), the brightness correction ratio WAVE=1. On the other hand, when AVEMAX is $D_1$ or less, the brightness correction ratio WAVE is gradually reduced. Further, when AVEMAX is equal to or less than a certain value $D_0$ ($D_0<D$), WAVE=0. On the other hand, if the input image is inherently bright, there is no need to further brighten the input image. Therefore, when AVEMAX is $D_2$ or more, the brightness correction ratio WAVE is gradually decreased.

Figure 11B:
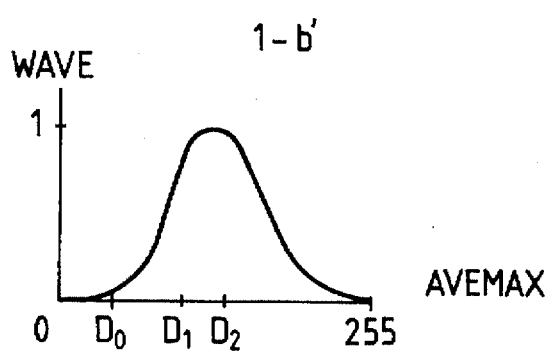

For instance $D_0=30$, $D_1=90$, and $D_2=127$. However, those values can be also deviated by about ±20. The membership function 1-*b* may be also set as shown in FIG. 11B.

Further, the CPU 37 obtains the grade of the white level dependency WDSA for color balance correction from the chromatic color chromaticity DSA of the white level by the membership function 1-*c* (step S37). The fact that the value of the chromatic color chromaticity DSA of the white level is large means that a possibility such that although the operator considered that the image is at the white level, the image is not white is high. Therefore, in this case, the CPU 37 corrects the color balance by paying an importance to the average value of all of the image data than the white level. In the embodiment, the membership function 1-*c* specifies the relation between the chromatic color chromaticity DSA of the white level and the white level dependency WDSA for color balance correction in the following manner. That is, when DSA is larger than a certain value $B_1$, WDSA=0. When DSA is smaller than a certain value $B_0$ ($B_0<B_1$), WDSA=1. On the other hand, when DSA lies within a range from $B_0$ to $B_1$, WDSA gradually changes from 1 to 0.

Figure 11C:
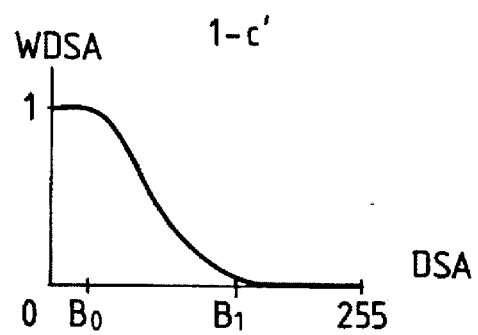

For instance, although $B_0=30$ and $B_1=130$, these values can be also deviated by about ±20. On the other hand, the membership function 1-*c* may be also set as shown in FIG. 11C.

The CPU 37 then obtains the grade of the color balance correction ratio WSA from the chromatic color chromaticity AVESA of the average value of all of the image data by the membership function 1-*d* (step S38). The fact that the chromatic color chromaticity AVESA of the average value is large means that a possibility in which the original image is inherently deviated from the theorem of Evans is high. Therefore, the CPU 37 reduces the color balance correction ratio.

In the embodiment, the membership function 1-*d* specifies the relation between the chromatic color chromaticity AVESA of the average value and the color balance correction ratio WSA in the following manner. That is, when AVESA is larger than a certain value $A_1$, WSA=0. When AVESA is smaller than a certain value $A_0$ ($A_0<A_1$), WSA=1. When AVESA is larger than $A_0$ and smaller than $A_1$, WSA gradually changes from 1 to 0.

Figure 11D:
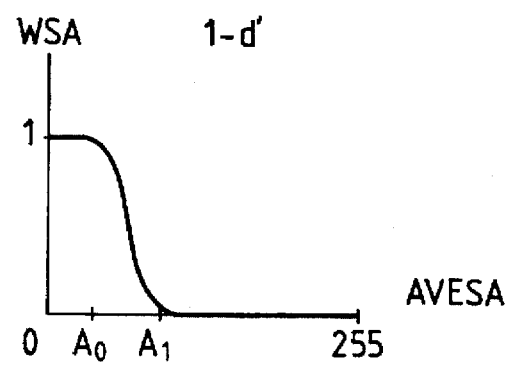

For instance, although $A_0=50$ and $A_1=100$, these values can be also deviated by about ±20. The membership function 1-d may be also set as shown in FIG. 11D.

As already described in step S37, the white level dependency WDSA of the color balance is a value to decide whether the color balance is corrected by paying a significance to the white level or the average value. On the other hand, the color balance correction ratios based on the white level are set to DMAX/RMAX, DMAX/GMAX, and DMAX/BMAX for R, G, and B, respectively. On the other hand, the color balance correction ratios based on the average value are set to AVEMAX/AVER, AVEMAX/AVEG, and AVEMAX/AVEB.

The CPU 37 multiplies the weights of the dependency WDSA and (1-WDSA) to the color balance correction amount based on the white level and to the color balance correction amount based on the average value, respectively, thereby obtaining the color balance correction ratio based on the white level and the color balance correction ratio based on the average value. Further, the color balance correction ratio is obtained by the sum of those ratios (step S39). In step S39, DMAX/RMAX is a correction term based on the R component of the white level and AVEMAX/AVER is a correction term based on the R component of the average value. By multiplying the weights of the dependency WDSA and (1-WDSA) to those correction terms and adding the results, BALR is obtained. BALG and BALB are also obtained in a manner similar to the above. For the color balance correction ratios obtained in step S39, if the color balance of the white level is obtained, significance is paid to the color balance correction ratio based on the white level; on the other hand, if the color balance of the white level is not obtained, significance is paid to the color balance correction ratio based on the average value.

Since either one of the color balance correction ratios BALR, BALG, and BALB needs to be set to 1, they are normalized (step S40). Further, the CPU 37 obtains the color balance correction amount from the color balance correction ratios and color balance correction ratio WSA (step S41). The color balance correction amount obtained in step S41 increases if the color balance of the average value is obtained, while it decreases if the color balance of the average value is deviated.

On the other hand, in order to correct the brightness, the CPU 37 multiplies the dependency WDMAX and (1-WDMAX) to the brightness correction amount based on the white level and the brightness correction amount based on the average value, respectively, and obtains the brightness correction ratio based on the white level and the brightness correction ratio based on the average value. Further, the CPU obtains a brightness correction ratio AE by the sum of those ratios. Moreover, the CPU obtains a brightness correction amount WAE from the brightness correction ratio AE and brightness correction ratio WAVE.

In the case of obtaining AE, DMAX indicative of the white level is made correspond to 255 and the average value of all of the pixels is made correspond to 127 (that is, 255/2). The CPU 37 multiplies the weights of the dependency WDMAX and (1-WDMAX) to the correction amounts based on the white level and the average level, thereby obtaining the brightness correction ratio AE. For the brightness correction ratio AE, when the detected white level is actually close to white, significance is paid to the white level. On the contrary, if the detected white level is actually far from white, importance is paid to the average value. The brightness correction amount WAE decreases when the average value is too bright and when it is too dark. On the other hand, WAE increases when the average value is set to a standard value.

The color balances which are finally obtained by the products of the brightness correction amount WAE and the color balance correction amounts and the correction amounts $\gamma_R$, $\gamma_G$, and $\gamma_B$ of the brightness indicate the inclinations in FIG. 7. The CPU 37 selects the near inclination among ① to ⑧ in FIG. 7 with respect to each of R, G, and B and sets into the correction table 39. In correspondence to ① to ⑧ in FIG. 7, the CPU 37 selects proper one of the tables ① to ⑧ in FIG. 8 and sets into the correction table 34.

As mentioned above, the correction tables 34 and 39 are set. The processes after the correction tables were set will now be described. When the correction table 34 is set, the SV image of the memory 33 is subjected to the degamma process (the SV signal is raised to the 2.2nd power) and the density converting (logarithm conversion) process by the correction table 34 together with the color balance correction and the brightness correction. That is, the correction table 34 converts the SV images which were read out of the memory 33 in accordance with the tables which were independently set. In the next masking process, the processes such as elimination of the impurity of color, undercolor removal, and the like are executed. The signals of Y, M, C, and Bk (yellow, magenta, cyan, black) are obtained and output to a printer 36. Any one of the electrophotographic type, ink jet type, and thermal copy transfer type may be used as a printer 36.

On the other hand, when the correction table 39 is set, the color balance and brightness of the image data in the memory 38 are corrected by the correction table 39. After the digital signals were converted into the analog signals by a D/A converter 40, they are converted into the monitor signals by an analog encoder 41 and displayed by a color monitor 42.

As mentioned above, in the embodiment, to correct the color balance, the CPU 37 detects the average level and the white level of the sampled image data and discriminates the color balance of the white level. If the chromatic color chromaticity of the white level is high, this means that the white level could not accurately be detected. Therefore, the CPU 37 pays a significance to the color balance of the average level and corrects the color balances of all of the image data. On the other hand, if the chromatic color chromaticity of the white level is low, this means that the white level could accurately be detected. Therefore, the CPU 37 pays a significance to the color balance of the white level and corrects the color balances of all of the image data. For instance, in the case of an image such that a white cloud floats in a blue sky, the color balance of the average level is one-sided to blue. However, the color balance of such an image can be accurately corrected on the basis of the color balance of the white level.

Whether a significance should be paid to the average level or the white level can be obtained from the experimental rules by experimentally executing the corrections with respect to various images. The resultant data is previously registered into the ROM 13.

In the above description, one of the correction tables ① to ⑧ in FIGS. 7 and 8 has been selected. However, the CPU 37 may also form a proper correction table from the values of $\gamma_R$, $\gamma_G$, and $\gamma_B$. On the other hand, the number of tables to be selected can be also increased or decreased as necessary. On the other hand, although the brightness has been corrected by using the average value, the maximum RGB values Can be also used or it is also possible to consider to use a combination of both of the average value and the maximum RGB values. On the other hand, when the color balance is corrected, the maximum RGB values have preferentially been used. However, the order of priorities can be also changed.

Although the embodiment has been described with respect to the case of inputting and processing the RGB signals, the YMC signals can be also input and processed.

[Fourth embodiment]

Figure 12:
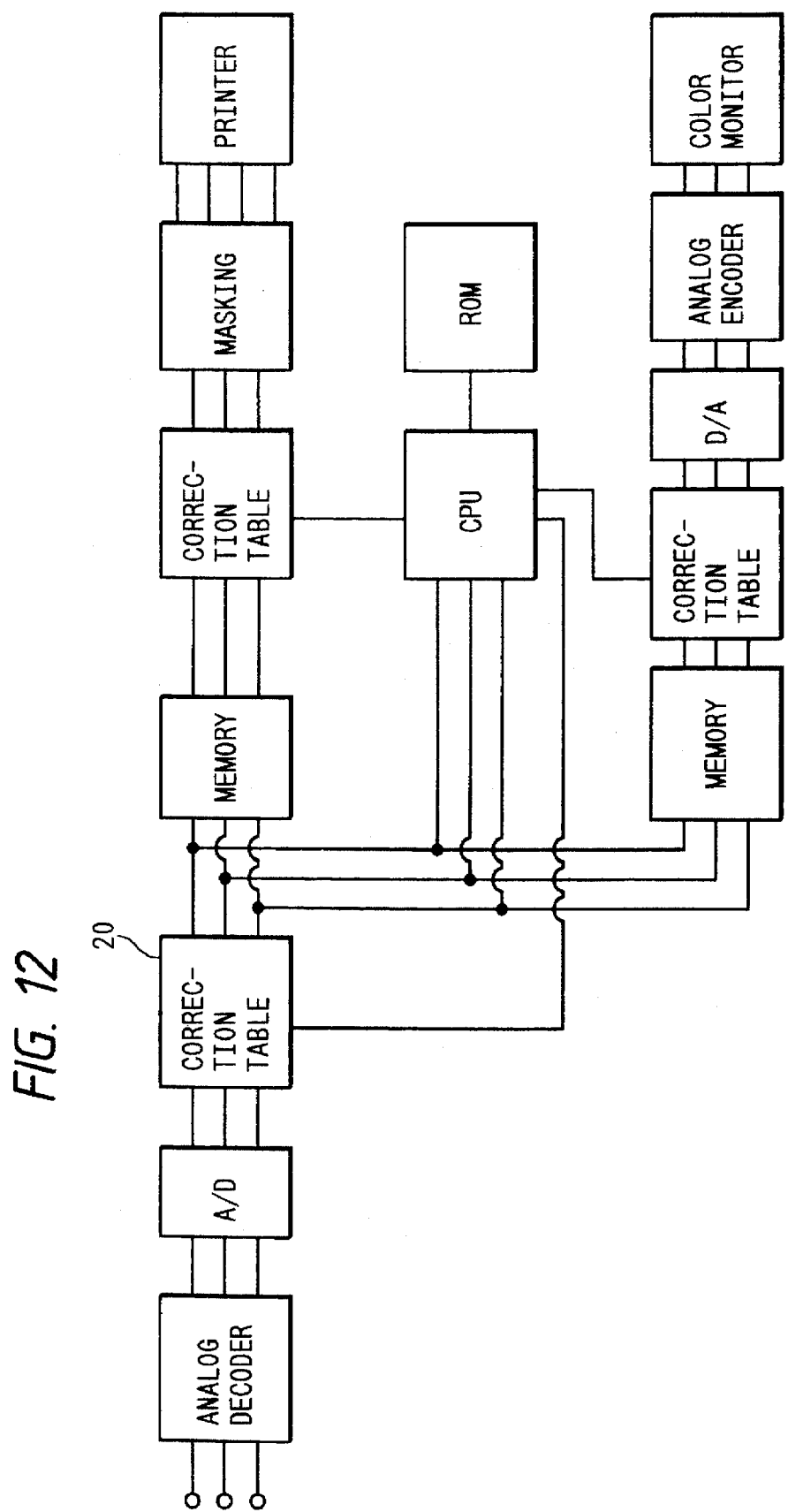
FIG. 12 is a circuit block diagram of the fourth embodiment of the invention.

On the Other hand, as shown in FIG. 12, it is also possible to construct in a manner such that the correction table 20 is arranged before the memory and the correction table is once set to the table of $\gamma_R = \gamma_G = \gamma_B = 1$. That is, the image is stored into the memory, the color balance and brightness are examined by the processes of FIG. 9, and the resultant $\gamma_R$, $\gamma_G$, and $\gamma_B$ are set into the correction table 20. After that, the image is again fetched from the SV camera or SV floppy and the image whose color balance and brightness were corrected by the correction table 20 is stored into the memory.

On the other hand, although the embodiment has been described with respect to the processes to brighten only the dark image, it is also possible to add a correcting method such as to return the image which is too bright to an image of an ordinary brightness.

The generating source of the image data is not limited to the SV but even in the case of using a CCD (charge coupled device) line scanner or a semiconductor memory of a large capacity, the color balance and the brightness can be also similarly corrected.

As mentioned above, in the embodiment, the CPU 37 obtains the average value and the white level from the RGB image signals which were read out of the SV camera or floppy and stored into the memory. Further, the CPU 37 discriminates the degrees of the average value and white level obtained by using the prepared membership functions. The brightness and color balance of the image are corrected in accordance with the degrees of the average value and white level. Therefore, the deviation of the color balance and the difference in image recording level (brightness) which occur due to the difference of the maker of the SV camera or the difference of the type of apparatus can be corrected. Further, there are advantages such that it is prevented that the correction is executed too much and that it is possible to prevent the occurrence of the extreme correction such that the correction is performed or is not executed in dependence on a slight difference of the input image level. Therefore, there is an effect such that the correction is more naturally executed.

As described above, according to the embodiment, by correcting the color image signal in accordance with each of the average value and the white level, the color image signal can be optimally corrected. Therefore, according to the invention, a proper color image can be obtained without unnecessarily changing the characteristics of the input color image.

Although the present invention has been described above on the basis of the preferred embodiments, the invention is not limited to the foregoing embodiments but many modifications and variations are possible within the spirit and scope of the appended claims of the invention.

What is claimed is:

1. An image processing apparatus comprising:

input means for inputting image data representing a color image;

a processor for performing color processing on the input image data;

extraction means for extracting a first characteristic value relating to a white level of the color image and a second characteristic value relating to a feature different from the white level of the color image, on the basis of the input image data;

determination means for determining respective weights of the first and second characteristic values, on the basis of predetermined functions of the first and second characteristic values; and control means for controlling the color processing of the color image, on the basis of the weights and the first and second characteristic values.

2. An apparatus according to claim 1, wherein the color image is an entire original image.

3. An apparatus according to claim 1, wherein the first and second characteristic values relate to brightness processing.

4. An apparatus according to claim 1, wherein the first and second characteristic values relate to color balance processing.

5. An apparatus according to claim 1, wherein the weights of the respective first and second characteristic values are determined such that if one of the weights becomes larger the other becomes smaller.

6. An apparatus according to claim 1, further comprising storage means for storing tables respectively corresponding to the different color processing, and wherein said control means selects the table for the color image, on the basis of the weights and the first and second characteristic values, and said processor performs the color processing by using the selected table.

7. An apparatus according to claim 1, wherein said extraction means extracts white data and average data from the color image data, as the first and second characteristic values.

8. An apparatus according to claim 1, wherein the predetermined functions are membership functions which are determined based on respective components of the first and second characteristic values.

9. An image processing method comprising:

an input step of inputting image data representing a color image;

a processing step of performing color processing on the input image data;

an extraction step of extracting a first characteristic value relating to a white level of the color image and a second characteristic value relating to a feature different from the white level of the color image, on the basis of the input image data;

a determination step of determining respective weights of the first and second characteristic values, on the basis of predetermined functions of the first and second characteristic values; and a control step of controlling the color processing of the color image, on the basis of the weights and the first and second characteristic values.

* * * * *

UNITED STATES PATENT AND TRADEMARK OFFICE
CERTIFICATE OF CORRECTION

PATENT NO.    : 5,696,840
DATED         : December 9, 1997
INVENTOR(S)   : Akihiro Usami It is certified that error appears in the above-identified patent and that said Letters Patent is hereby corrected as shown below:

<u>Title page,</u>
*Attorney, Agent, or Firm*, "Fitzpatric, Cella, Harper & Scinto" should read
-- Fitzpatrick, Cella, Harper & Scinto --.

<u>Column 1,</u>
Line 26, "manufacturing maker" should read -- manufacturer --; and
Line 52, "from" should read -- from the --.

<u>Column 2,</u>
Line 19, "embodiment," should read -- first embodiment, --.

<u>Column 5,</u>
Line 5, "H," should read -- M, --; and
Line 6, "porcess," should read -- process, -- and
"YHC" should read -- YMC --.

<u>Column 6,</u>
Line 8, "image signal" should read -- image signals --;
Line 24, "of" should read -- or --;
Line 39, "siganls" should read -- signals --; and
Line 53, "images" should read -- image --.

<u>Column 7,</u>
Line 28, "that" should be deleted;
Line 48, "a" should read -- more --; and
Line 56, "paid" should read -- attributed --.

<u>Column 8,</u>
Line 12, "than they are" should read -- more than --;
Line 26, "instance" should read -- instance, --;
Line 37, "paying an" should read -- giving --; and
Line 38, "than" should read -- greater than --.

UNITED STATES PATENT AND TRADEMARK OFFICE
CERTIFICATE OF CORRECTION

PATENT NO. : 5,696,840
DATED : December 9, 1997
INVENTOR(S) : Akihiro Usami

It is certified that error appears in the above-identified patent and that said Letters Patent is hereby corrected as shown below:

Column 9,
Line 6, "paying a" should read -- giving --;
Line 30, "paid to" should read -- given --;
Line 32, "oh" should read -- on --;
Line 33, "paid" should read -- given --;
Line 44, "hand,." should read -- hand, --
Line 63, "paid" should read -- given --; and
Line 65, "paid" should read -- given --.

Column 10,
Line 43, "pays a" should read -- gives --;
Line 48, "pays a" should read -- given --;
Line 55, "paid" should read -- given --; and
Line 67, "Can" should read -- can --.

Column 11,
Line 10, "Other" should read -- other --.

Signed and Sealed this

Twenty-fourth Day of December, 2002

JAMES E. ROGAN
*Director of the United States Patent and Trademark Office*